INVENTORS.
VENANCIO SANCHEZ
CANDIDO I. SANCHEZ
BY
*John Cyril Malloy*
ATTORNEY.

United States Patent Office 3,516,058
Patented June 2, 1970

3,516,058
DUAL WARNING INDICATOR DEVICE
Venancio Sanchez, Miami, Fla. (P.O. Box 711, Marathon, Fla. 33050), and Candido I. Sanchez, 10890 SW. 34th St., Miami, Fla. 33165
Filed June 24, 1966, Ser. No. 560,185
Int. Cl. B60q 9/00
U.S. Cl. 340—52                                    2 Claims

ABSTRACT OF THE DISCLOSURE

A brake warning voltage divider circuit electrically connected between one terminal of the electrical source of a vehicle and the other pole of the source, the voltage divider circuit being arranged to indicate the condition of the brake system, the circuit including a normally open switch, a plurality of indicator lights including a main indicator light adapted to be mounted on the driving instrument panel of the vehicle and a pair of secondary indicator lights to be arranged exteriorly of the vehicle and electrical means to connect the light means so that when current flows through the main indicator means it will cause a visible indication as to the amount of current flow through the secondary indicator means and thereby indicate the operability of the vehicle brake system and brake lights.

---

This invention relates to the brake system of a vehicle, and, more particularly, to the electrical system which operates in conjunction with a vehicle brake system to visually indicate whether or not the brakes are applied or not and provides an improvement comprising a signal light arranged to indicate whether or not the electrical system is functioning properly.

As is well known, a defective brake light is an extremely hazardous malfunction and contributes to numerous accidents since a vehicle traveling at high speed must have an adequate visual inspection of the brake condition of a vehicle ahead of it. This invention provides an electrical system to indicate the condition of a brake system, that is, whether the brakes are applied or not, and includes check means to signal when the electrical system is not functioning properly.

More specifically, the instant invention comprises an electrical circuit having a main indicator light for indication of the operativeness of the hydraulic system of a brake mechanism and at the same time the operativeness of the stop lights of the vehicle, with a novel arrangement of the main indicator so that the indicator light changes in intensity for various conditions of the brake system and associated electrical system whereby an operator can determine if the stop lights are operating properly. The invention will warn a vehicle operator of a faulty or defective hydraulic switch.

It is, therefore, an object of the present invention to provide a dual warning indicator device including a main indicator means for the instrument panel of a vehicle to indicate every time the brake is applied and by the signal given by the main indicator means whether or not the stop lights carried exteriorly of the vehicle are functioning correctly.

It is also an object of this invention to provide a brake warning circuit electrically connected between an electrical source with one pole being connected to the chassis of a vehicle and with the other pole being connected to the instant circuit, which circuit includes a normally opened switch means including means connecting it to a brake member of a vehicle and arranged to close the switch on movement of the brake to an applied condition; and a plurality of indicator lights including a main indicator means adapted to be mounted on the instrument panel of a vehicle and electrically in parallel with a pair of secondary indicator lights in parallel with each other and carried so as to be visible exteriorly of the vehicle so that on current flow through both indicator lights of the pair, the main indicator means will reflect that condition and, if there is an interruption of current to either or both of the indicator lights or through the switch means, the main indicator light will so indicate and thereby warn the driver of any condition of the brake system, both the mechanical and electrical aspects thereof.

It is a general object of this invention to provide an improved warning system to indicate the condition of a brake system of a vehicle which is inexpensive to manufacture, relatively easy to install, and which is otherwise well adapted for the purposes for which it is intended.

In accordance with these and other objects which will become apparent hereinafter, the instant invention will now be described with reference to the accompanying drawings in which.

Figure 1:
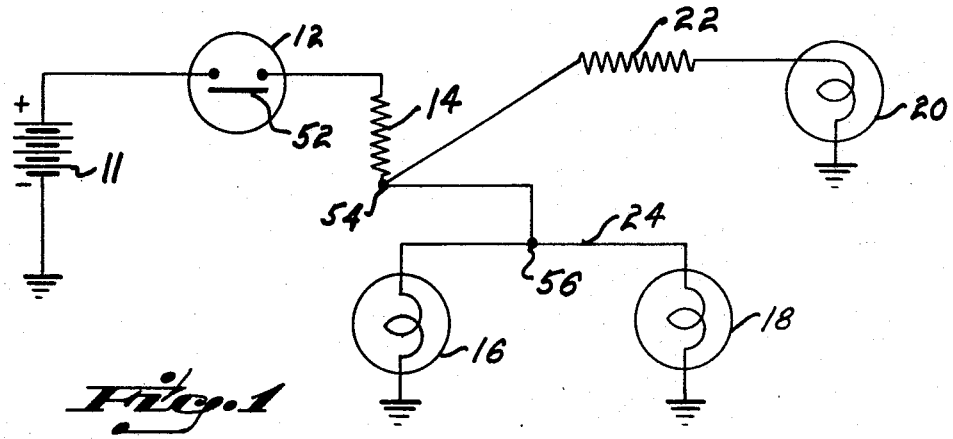
FIG. 1 is an electrical diagram illustrating the elements of the instant invention.

Referring to the drawings, wherein like reference characters designate like or corresponding parts throughout the different views and are designated with the prime and double prime designations for brevity of this specification, the numerals 11, 11′ and 11″ designate a source which is electrically connected to a switch means 12 which in turn is in series with a resistor element 14 and in series with a plurality of indicator lights 16, 18 and 20 which include the main indicator light means 20 which is adapted to be mounted to the driver's instrument panel of a vehicle and which is in series with a resistor element 22 and in parallel with the indicator light pair 16 and 18. The source as well as the plurality of indicator lights are connected to the vehicle chassis by suitable connector means which connect the aforesaid elements in the manner indicated, the connector or conductor means being designated generally by the numeral 24 and the prime designations throughout the drawings.

Figure 2:
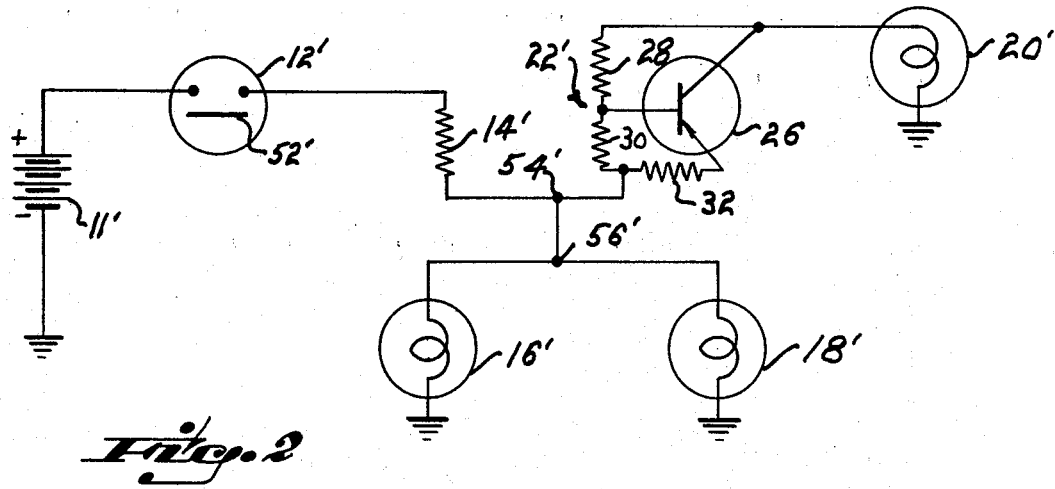
FIG. 2 is an electrical diagram similar to FIG. 1 and illustrating a modification of the invention shown in FIG. 1.
Figure 3:
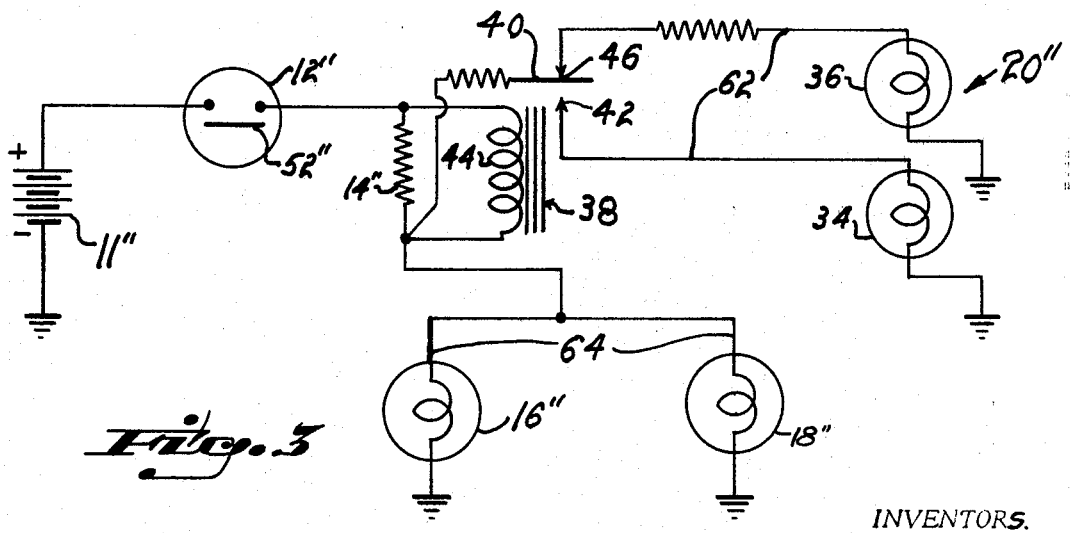
FIG. 3 is a second modified arrangement of the electrical components of the invention electrically depicted in FIG. 1.

The drawings of FIGS. 2 and 3 are similarly designated to that of FIG. 1 with the exception that: in FIG. 2 the resistor 22′ is electrically connected to a transistor 26 circuit and individual resistor elements 28, 30 and 32 arranged as indicated to control current flow in the manner described hereinafter with reference to FIG. 1 to the main indicator means 20′; and the main indicator means of FIG. 3 generally designated 20″ includes a first and a second indicator light 34 and 36 which are of contrasting colors and are each connected to grounds. Also, in FIG. 3 a relay switch 38 which is normally arranged to permit current flow through the light 34 is provided and arranged to move the switch arm 40 to the terminal point 42 on energization of the coil 44 caused by current flow of sufficient amount to overcome a normal bias urging the switch arm 40 in engagement with the terminal 46 as will be explained more fully hereinafter.

The operation of the instant invention will best be described, initially, on reference to FIG. 1. There are several conditions which it is desired will be reflected by the indicator means 20 including, a non-operating indicator light 16 or 18 or a failure in operation of the hydraulic switch 12. Each of these conditions will be considered in seriatum hereinafter with appropriate reference to FIG. 1.

When the hydraulic and electrical systems are in a desired mechanical working condition, a slight pressure applied to the vehicle brake pedal, indicated by the numeral 52, will close the switch 12 and permit current to flow therethrough, through the resistor 14 to be divided at the junction 54 so that a portion of the current flows through the main indicator means 20 and the resistor in series therewith 22 and a portion flows to the junction 56 to divide and flow through the elements, the lights, 16 and 18. The condition of the indicator means 20 on such current flow is the normal desired and standard condition of the system.

If one of the stop lights, either 16 or 18, is inoperative, the current division at the junction indicated by the numeral 54 will be such as to cause increased current flow through the main indicator means 20 to give a more intense or brighter indication and warn the vehicle operator that one of the stop lights is out of order. In a similar manner, if both stop lights, 16 and 18, are not operating there will be an even greater and, therefore, even brighter indication rendered by the main indicator means which in relation to the condition when only one stop light is out will indicate to the operator that both of the stop lights are out of order. Also, if the main brake pedal switch 12 is not operating properly so that the hydraulic fluid is the subject of pressure for transmitting forces to the mechanically operated brakes, current flow will be continuous whether the brake pedal is applied or not. This will result in the main indicator means 20 being illuminated at all times, as will the stop lights 16 and 18 providing a continuous warning to the operator of this failure. If the hydraulic pressure switch 12 is burned or open when the brake is applied and the stop lights are operating properly, there will be no current flow through the main indicator means 20 even when the vehicle is under full brake pressure and this failure will be indicated by the absence of any light to warn the operator of this failure. In the event that the main hydraulic pressure switch 12 has undergone a change of the pressure operating range which is not intended, and the stop lights 16 and 18 are operating properly, an operating pressure value of greater quantity will be required to close the switch and the amount of pressure compared to the normal brake pedal application before the indicator means 20 will be illuminated will warn the operator. The absence of light in the main indicator means 20 when the brake is applied with normal pressure will warn the operator of the failure. It is significant to note at this point that a vehicle may pass inspection if the hydraulic pressure switch has undergone a pressure operating range change since the brake pedal is pressed hard when the stop lights and main indicator light will go on due to the higher hydraulic pressure of the main hydraulic pressure switch 12.

The connections, operations and indications of FIG. 2 are identical as in the foregoing with respect to FIG. 1 for all conditions and the only difference is that the transistor 26 circuit with the resistor elements 28, 30 and 32 control current flow to the main indicator means for all conditions and polarity must be observed in this installation.

With reference to FIG. 3 current is adapted to flow from the source 11" through the main hydraulic switch means 12" and a parallel arrangement of a resistor and relay in series therewith through the plurality of indicator lights which are in parallel therewith; and the lights being in a circuit which includes a first branch 62 and a second branch 64, the branch indicated by the numeral 62 being the main indicator means and the branch indicated by the numeral 64 being the stop light indicator signals. The main indicator means includes a switch which is normally in the position shown in FIG. 3 and which, on current flow through the coil 44 of sufficient intensity to overcome a bias of the switch arm 40, is such that the arm 40 engages the terminal 42 and permits of current flow through the element 34. Preferably the element 34 is colored red and the element 36 is of a green color.

With continuing reference to FIG. 3, when the hydraulic and electrical systems are in the desired working order, a slight pressure applied to the brake pedal will cause current to flow through the hydraulic switch means 12" as well as the main indicator means element 34 and the stop lights 16" and 18" of the parallel circuit designated by the numeral 64. Current will also flow through the coil 44 which is in parallel with the resistor element 14" to energize it and cause the switch arm 40 to move to the terminal 42 and in turn cause the main indicator means element 34 to be illuminated. If one of the stop lights either 16" or 18" is burned out, the switch arm 40 will also engage the terminal 42 and cause current to flow through the element 34; however, there will be an increased current flow which will cause the red light to glow with a brighter intensity; on the other hand, if both the light 16" and 18" are inoperative there will be no current flow through the parallel circuit indicated by the numeral 64. The current will flow through the normally closed switch arm position 40 in engagement with the terminal 46 to light the red indicator lamp 36 of the main indicator means to indicate the stop light failure. If the main hydraulic switch is closed current will flow continuously, if the stop lights are operating, and the indicator means of the circuit 62 will be illuminated at all times as will the stop lights 16" and 18" with the continuous lighting of the main indicator means 20' indicating the failure. Also, if the hydraulic pressure switch is burned or open when the brake is applied so as to be inoperative and the stop lights are properly functioning, there will not be any current flow through the stop lights nor the main indicator means 20 so that the absence of any light will warn the operator of this condition. In the event that the hydraulic pressure switch has undergone an unintended change of a pressure operating range and the stop lights are operating properly, in contrast to normal operation wherein the switch 12" will close upon slight pressure application, the switch will require greater pressure to close and, therefore, on normal brake pedal force application neither the main indicator means 20" nor the stop light indicator means 16" and 18" will be on until the vehicle has almost come to a stop. By this time the operator having applied heavy pressure to the brake pedal will note that the main indicator means will become illuminated. The absence of a light while the vehicle brake is applied with normal foot pressure warns the operator of this failure.

What is claimed is:

1. A brake warning voltage divider circuit electrically connected between one terminal of an electrical source and the chassis of a vehicle which is connected to the other pole of the source, said voltage divider circuit being to indicate the condition of the brake system of a vehicle device and comprising:
  a single normally open switch, means connecting said switch to the brake system of an automobile and responsive to the fluid pressure forces applied in the brake system to operate the mechanical portions of the brake and arranged to close said switch on movement of the brake to an applied condition, and, including a resistant means in series with said switch means; and
  a plurality of indicator lights including:
    (a) a main indicator light means adapted to be mounted to the driving instrument panel on a vehicle, and
    (b) a pair of secondary indicator light means visible exteriorly of the vehicle and electrically in parallel with one another, said pair of secondary light means being connected in parallel with respect to each other whereby if one secondary light means fails the other will be intensely illuminated upon actuation of the circuit, and
    (c) connector means to connect the main indicator means and the pair of secondary indicator means in parallel when current flows through all of said indicator means;

and means to electrically connect said switch and said plurality of lights in series and between said source and ground of the vehicle so that energy will flow through the main indicator means to cause an indication to be given which depends
- (1) upon current flow through either, neither or both of the indicator means of said pair and
- (2) current flow through said switch means.

2. A circuit as set forth in claim 1 wherein said main indicator means comprises a first and a second signal lamp and includes a switch arm normally biased to permit current flow through one of said lamps and an electromagnet adapted to be energized on current flow through said switch means and either or both of the indicator means of said secondary pair of indicator means to move the switch arm to permit current flow through the second lamp of the main indicator means.

References Cited

UNITED STATES PATENTS

| | | | |
|---|---|---|---|
| 2,957,161 | 10/1960 | Daws | 340—71 |
| 3,171,096 | 2/1965 | Murray et al. | 340—69 |

THOMAS B. HABECKER, Primary Examiner

H. S. COHEN, Assistant Examiner

U.S. Cl. X.R.

340—69